(12) United States Patent
Osakabe et al.

(10) Patent No.: US 7,181,299 B2
(45) Date of Patent: Feb. 20, 2007

(54) TRANSMITTING METHOD AND APPARATUS

(75) Inventors: Yoshio Osakabe, Kanagawa (JP); Yoshiyuki Takaku, Tokyo (JP)

(73) Assignee: Sony Corporation (JP)

(*) Notice: Subject to any disclaimer, the term of this patent is extended or adjusted under 35 U.S.C. 154(b) by 862 days.

(21) Appl. No.: 09/730,340

(22) Filed: Dec. 5, 2000

(65) Prior Publication Data

US 2001/0006553 A1    Jul. 5, 2001

(30) Foreign Application Priority Data

Dec. 7, 1999    (JP)    ............................... P11-347991

(51) Int. Cl.
G06F 17/00    (2006.01)
G06F 15/16    (2006.01)
G06F 3/00    (2006.01)
H04J 3/16    (2006.01)
H04J 3/24    (2006.01)

(52) U.S. Cl. ................. 700/94; 370/471; 370/474; 709/236; 710/30

(58) Field of Classification Search ................ 700/94; 370/471, 474, 522, 524, 493, 465, 466, 467, 370/468, 469, 470, 472; 710/30; 709/236
See application file for complete search history.

(56) References Cited

U.S. PATENT DOCUMENTS

| 5,802,017 A | * | 9/1998 | Sato et al. ...................... 369/2 |
| 6,097,558 A | * | 8/2000 | Oguro ........................... 360/22 |
| 6,519,656 B2 | * | 2/2003 | Kondo et al. ................... 710/6 |

FOREIGN PATENT DOCUMENTS

EP    0762684 A2    *    8/1996

* cited by examiner

*Primary Examiner*—Vivian Chin
*Assistant Examiner*—Devona E. Faulk
(74) *Attorney, Agent, or Firm*—Lerner, David, Littenberg, Krumholz & Mentlik, LLP

(57) ABSTRACT

The present invention makes it possible to readily judge details of data transmitted through a bus line, such as channel structure, at a receiver's end. When data is transmitted in a predetermined format with units having a predetermined data length among devices linked to a bus line, the data is transmitted by setting up a section for transmitting auxiliary data of transmission data in a unit having the predetermined data length, and placing identification data related to spatial placement of the transmission data in a first section within the section for transmitting the auxiliary data, and data related to set-up of the transmission data in a second section within the transmitting section.

4 Claims, 18 Drawing Sheets

FIG. 15A

| 1 | 1 | 0 | 0 | * | * | * | * | S0 | S1 | S2 | S3 | S4 | S5 | S6 | S7 | S8 | S9 | SA | SB | SC | SD | SE | SF |

Label: bits "1 1 0 0 * * * *"
Speaker Position A: $S_0$–$S_F$
Sub Label spans Label and Speaker Position A

FIG. 15B

| 1 | 1 | 0 | 0 | * | * | * | * | SS0 | SS1 | SS2 | SS3 | SS4 | SS5 | SS6 | SS7 |

Speaker Position B

FIG. 15C

| 1 | 1 | 0 | 0 | * | * | * | * | C0 | C1 | C2 | C3 | C4 | C5 | C6 | C7 | C8 | C9 | CA | CB | CC | CD | CE | CF |

Channel

FIG. 15D

| 1 | 1 | 0 | 0 | * | * | * | * | I0 | I1 | I2 | I3 | I4 | I5 | I6 | I7 | I8 | I9 | IA | IB | IC | ID | IE | IF |

Microphone Positioning

FIG. 18A

| 1 | 1 | 0 | 0 | * | * | * | * | Display Position A | D0 | D1 | D2 | D3 | D4 | D5 | D6 | D7 | D8 | D9 | DA | DB | DC | DD | DE | DF |

Label — { 1 1 0 0 }
Sub Label — { Display Position A ... DF }

FIG. 18B

| 1 | 1 | 0 | 0 | * | * | * | * | Display Position B | DD0 | DD1 | DD2 | DD3 | DD4 | DD5 | DD6 | DD7 |

FIG. 18C

| 1 | 1 | 0 | 0 | * | * | * | * | Display Position C | DDD0 | DDD1 | DDD2 | DDD3 |

TRANSMITTING METHOD AND APPARATUS

BACKGROUND OF THE INVENTION

1. Field of the Invention

The present invention relates to transmitting method and apparatus suitably adapted to a case where audio data or image data of various schemes is transmitted via an IEEE 1394 bus line, for example.

2. Description of Relevant Art

Video data, audio data, and other kinds of data are now practically transmitted among a plurality of AV devices that are interconnected through a network via an IEEE 1394 bus line. In case of the IEEE 1394 bus line, an isochronous transmission channel (Iso-channel) used in transmitting a large volume of data, such as video data and audio data, and an asynchronous transmission channel (Async-channel) used in transmitting data related to a control command or the like are available, so that more than one kind of data is transmitted.

The format used in transmitting audio data (music data) via the IEEE 1394 bus line is detailed in [Audio and Music Data Transmission Protocol] disclosed at http://www.1394TA.org.

Also, image data accompanying with the audio data can be transmitted simultaneously. For example, image data to display lyrics or still image data of an image on the jacket is occasionally transmitted simultaneously with the audio data.

Audio data may be of a kind called multi-channel audio composed of two or more channels. When the multi-channel audio is transmitted, data in each channel has to be distinguished accurately at the receiver's end. However, because the multi-channel audio has various formats, it is quite difficult to distinguish the channel structure at the receiver's end. In particular, when the audio data is transmitted via a general bus line, such as the IEEE 1394 bus line, transmission of audio data in various formats is allowed in consideration of general versatility, which makes it more difficult to distinguish the channel structure.

In addition, when the image data accompanying with the audio data is transmitted, there arises a problem that in what manner the image data should be display cannot be determined at the receiver's end unless the display pattern of the image data is specified.

SUMMARY OF THE INVENTION

It is therefore an object of the present invention to make it possible to readily judge the details of data transmitted via a bus line, such as the channel structure, at the receiver's end.

In order to achieve the above and other objects, a transmitting method of the present invention is a transmitting method for transmitting data in a predetermined format per unit having a predetermined data length among devices linked to a certain bus line, wherein the data is transmitted by: setting up a section for transmitting auxiliary data of transmission data in a unit having the predetermined data length; and placing identification data related to spatial placement of the transmission data in a first section within the section for transmitting the auxiliary data, and data related to set-up of the transmission data in a second section within the section.

According to the above transmitting method, not only can the spatial placement of the transmission data be judged by the identification data placed in the first section within the auxiliary data, but also the details of the set-up of the transmission data can be judged by the data placed in the second section.

Also, in order to achieve the above and other objects, a transmitting apparatus of the present invention is a transmitting apparatus comprising: data input means for obtaining predetermined transmission data; transmission data generating means for dividing the transmission data obtained by the data input means into a plurality of items of data each having a predetermined data length, and generating transmission data of a specific format by placing label data specifying a scheme of each item of data in a head portion of the each item of data, the transmission data generating means also for generating auxiliary data having a predetermined data length and setting up a section used in transmitting the auxiliary data, the transmission data generating means further for placing identification data related to spatial placement of the transmission data in a first section within the auxiliary data, and data related to set-up of the transmission data in a second section within the auxiliary data; and sending means for sending the transmission data generated by the transmission data generating means to a certain bus line.

With the data transmitted from the above transmitting apparatus, the spatial placement thereof can be judged by the data in the first section within the auxiliary data, and the set-up thereof can be judged by the data in the second section.

BRIEF DESCRIPTION OF THE DRAWINGS

FIG. 15 is an explanatory view showing example data (in case of audio data) of auxiliary data in accordance with one embodiment of the present invention;

FIG. 18 is an explanatory view showing example data (in case of image data) of auxiliary data in accordance with one embodiment of the present invention;

DETAILED DESCRIPTION OF THE PREFERRED EMBODIMENTS

The following description will describe one embodiment of the present invention with reference to the accompanying drawings.

Firstly, an example arrangement of a network system to which the present invention is adapted will be explained with reference to FIG. 1. In the network system, a plurality of audio visual devices (hereinafter, referred to as AV devices) are interconnected via an IEEE 1394 serial data bus (hereinafter, referred to simply as the bus) 9 serving as a digital communication control bus.

Figure 1:
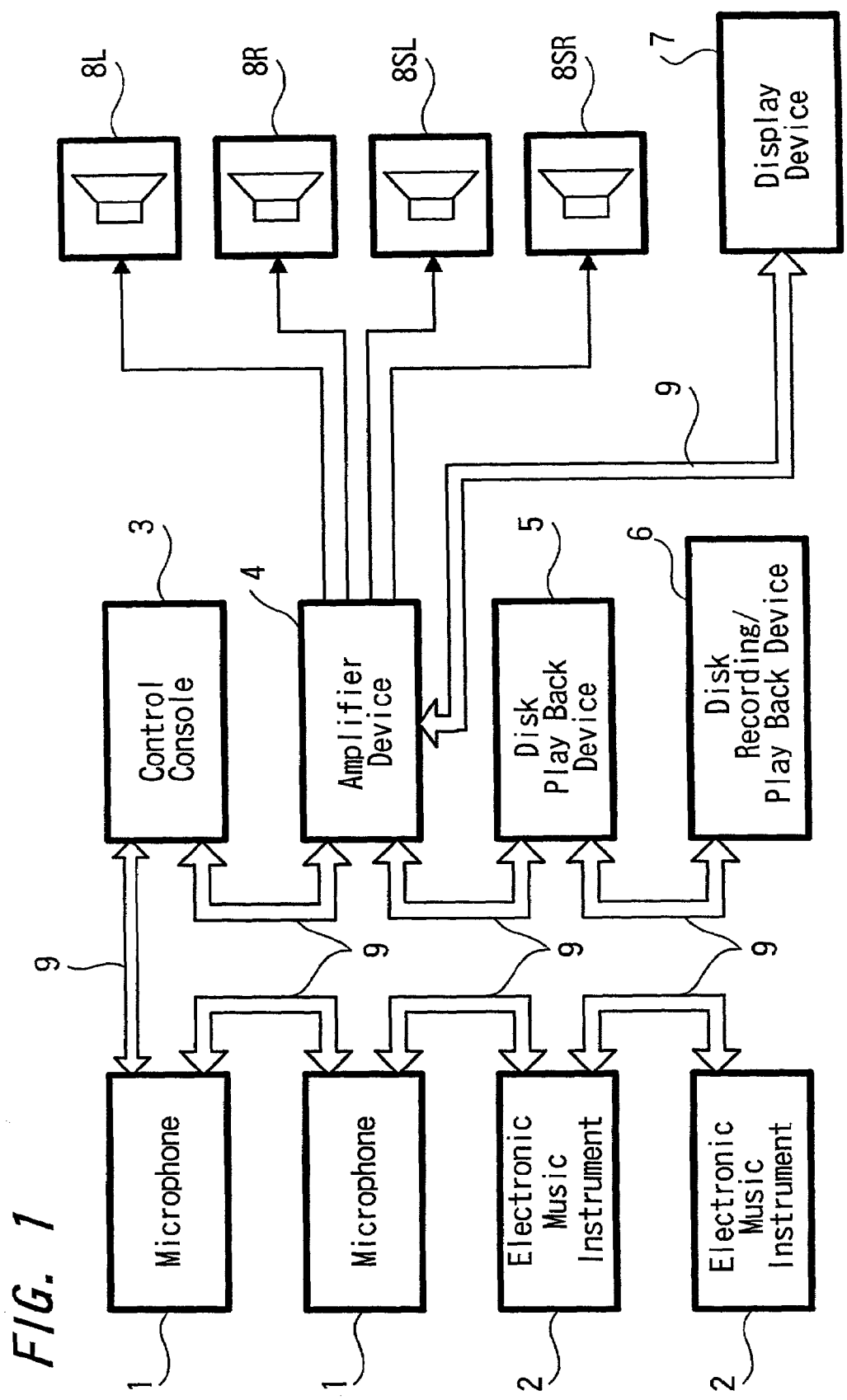
FIG. 1 is a block diagram depicting an example arrangement (first example) of an entire system in accordance with one embodiment of the present invention.

The following description will give an explanation of the arrangement shown in FIG. 1. That is, two microphone devices 1, two electronic music instruments 2, a control console 3, an amplifier device 4, a disk play back device 5, a disk recording/play back device 6, and a display device 7 are interconnected sequentially via a bus 9. When the IEEE 1394 bus 9 is used, the connection order of the devices is not especially limited as long as predetermined conditions, such as avoiding the loop connection, are satisfied.

The microphone devices 1 are the devices that collect sound where they are installed and output the collected audio data. The electronic music instruments 2 are devices that output audio data of a specific scheme, such as the MIDI data, in response to the manipulation of the keyboard or the like. The control console 3 is a device that adjusts the audio data transmitted on the bus 9 digitally by effecting audio processing of various kinds in regard to the audio data level, sound quality, channel structure, and added reverberation. The amplifier device 4 is connected to a plurality of speaker devices 8L, 8R, 8SL, and 8SR, and after adjusting the sound quality of the supplied audio data to the set level, it converts the audio data to an audio signal (analog audio signal) for driving the speakers, and supplies the audio signal to the connected speaker devices, so that the audio signal is outputted through their respective channels. The foregoing connection status of the speaker devices is an example only, and the speaker devices may be connected in another channel structure, which will be described below.

The disk play back device 5 is a device that reproduces audio data from a digital audio disk (optical disk) called a compact disk (CD). The disk recording/play back device 6 is a device that not only reproduces audio data from an optical disk or a magneto-optic disk called a mini-disk (MD), but also records audio data or the like into the magneto-optic disk.

When audio data is reproduced by the disk play back device 5 and disk recording/play back device 6, image data (still image data or motion image data) accompanying with the audio is reproduced simultaneously in some cases, and the reproduced image data is transmitted to the display device 7 via the bus 9 so as to be displayed thereon.

Figure 2:
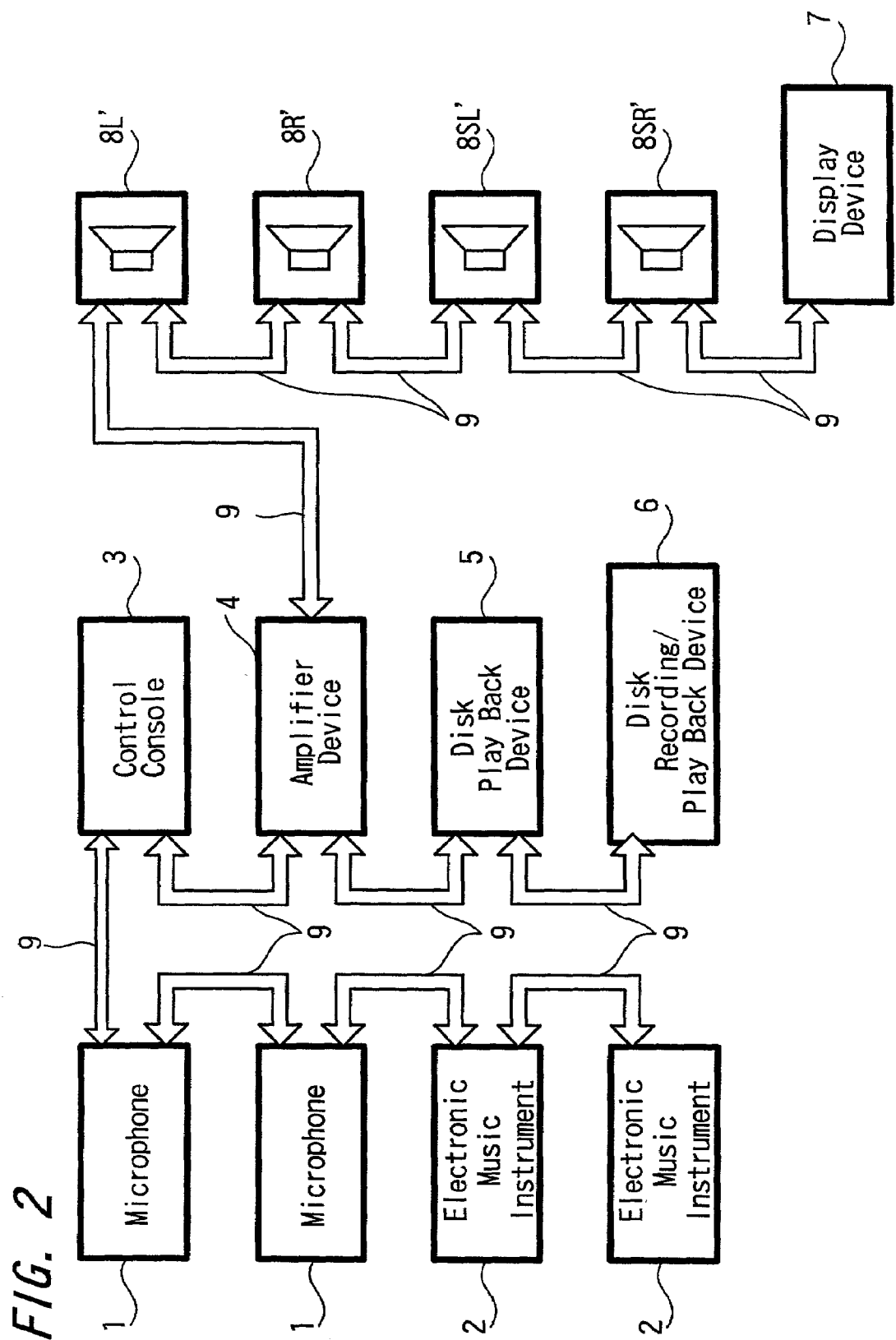
FIG. 2 is a block diagram depicting another example arrangement (second example) of the entire system in accordance with one embodiment of the present invention.

In the example shown in FIG. 1, the amplifier device 4 and each speaker is connected through an analog signal line. However, if the speaker devices are provided with terminals connectable to the bus 9 and capable of receiving digital audio data, the speaker devices may be connected to the bus 9 as shown in FIG. 2. More specifically, as shown in FIG. 2, speaker devices 8L', 8R', 8SL', and 8SR', each provided with a terminal connectable to the bus 9, are prepared and connected to the amplifier device 4 or the like via the bus 9, so that the digital audio data processed by the amplifier device 4 is outputted separately from the connected speaker devices through their respective channels.

Figure 3:
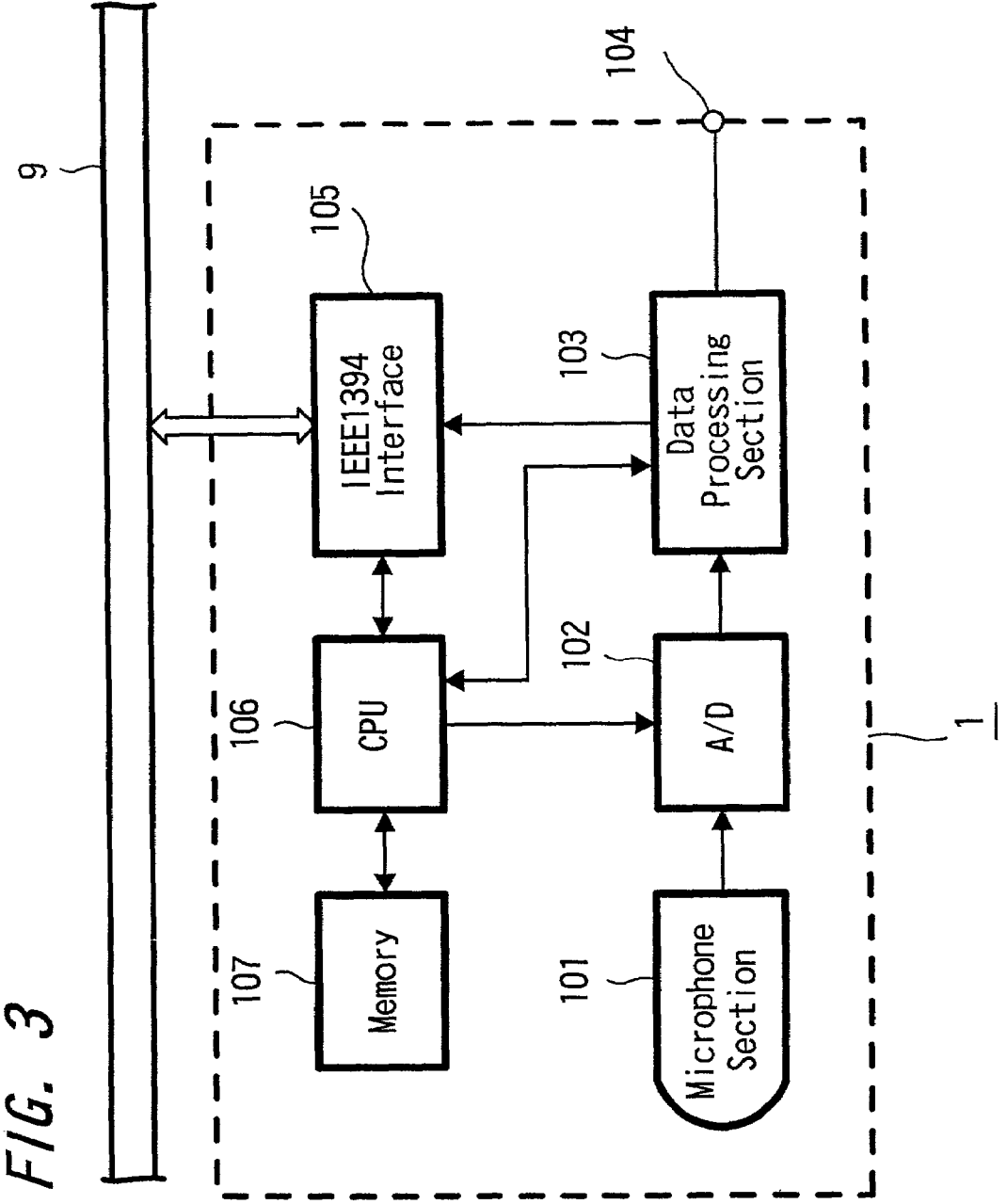
FIG. 3 is a block diagram depicting an example arrangement of a microphone device in accordance with one embodiment of the present invention.

Next, the following description will describe a concrete example arrangement of the AV devices linked to the bus 9. FIG. 3 is a view showing an example arrangement of the microphone device 1. The microphone device 1 includes a microphone section 101 for collecting sound, an analog-to-digital converter 102 for converting an audio signal (sound signal) outputted from the microphone section 101 to digital data, and a data processing section 103 for converting the digital data obtained by the analog-to-digital converter 102 into data of a specific format, and the data processed by the data processing section 103 is outputted to an external device through an output terminal 104. Also, the microphone device 1 includes an IEEE 1394 interface section 105 to establish a connection with the bus 9, a central control unit (CPU) 106 for controlling data transmission through the interface section 105, and a memory 107 for storing data necessary for the central control unit 106 to effect the control. Hence, the audio data processed by the data processing section 103 is sent to the bus 9 through the interface section 105 under the control of the central control unit 106.

Figure 4:
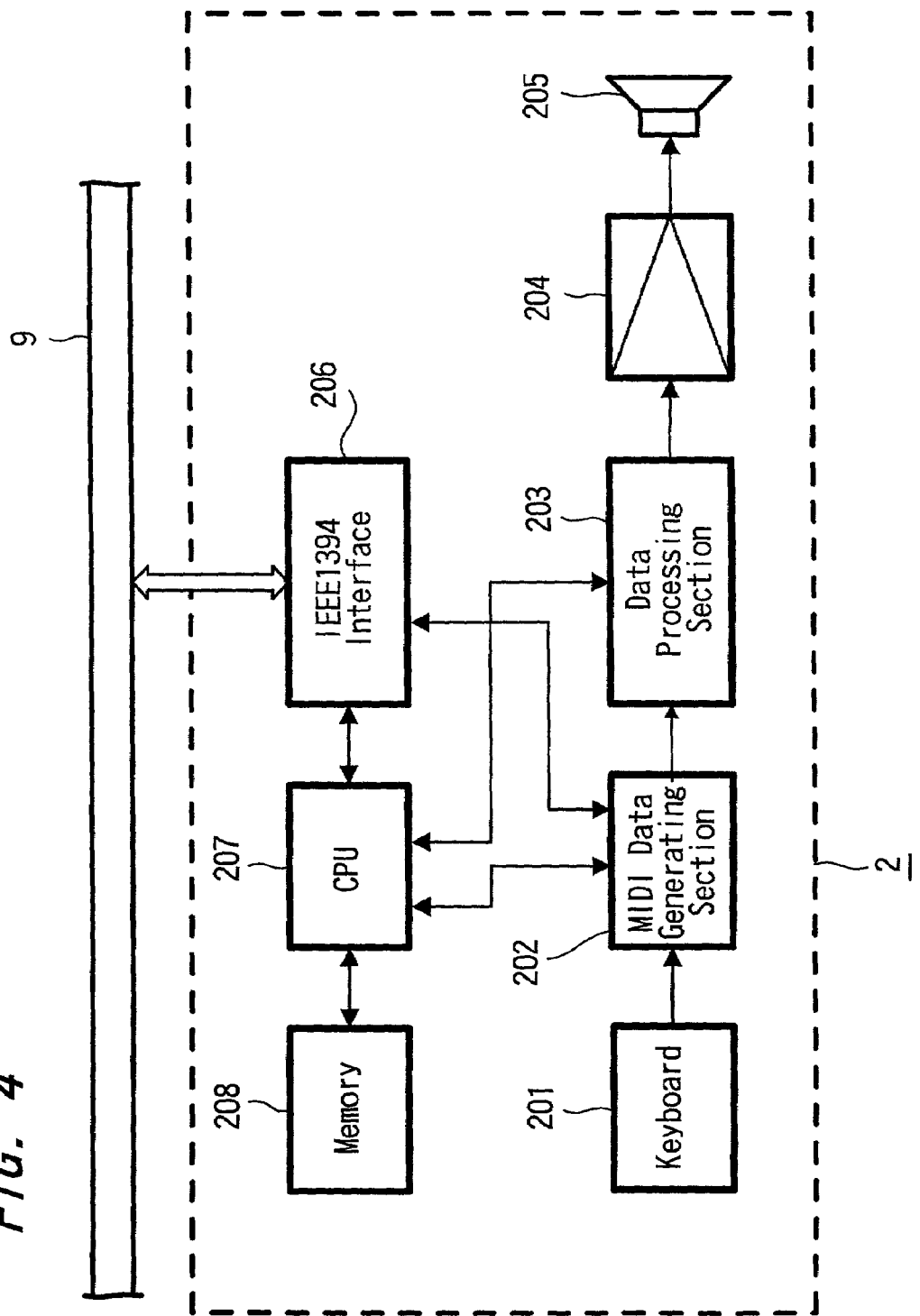
FIG. 4 is a block diagram depicting an example arrangement of an electronic music instrument in accordance with one embodiment of the present invention.

FIG. 4 is a view showing an example arrangement of the electronic music instrument 2. The electronic music instrument 2 includes a keyboard section 201 manipulated (played) by the user, a MIDI data generating section 202 for generating digital data of the MIDI standards out of the music information inputted from the keyboard section 201, and a data processing section 203 for converting the MIDI data generated by the MIDI data generating section 202 into a reproducing audio signal. The audio signal outputted from the data processing section 203 is supplied to a speaker 205 through an amplifier section 204 so as to be outputted.

Also, the electronic music instrument 2 includes an IEEE 1394 interface section 206 for establishing a connection with the bus 9, a central control unit 207 for controlling data transmission through the interface section 206, and a memory 208 for storing data necessary for the central control unit 207 to effect the control. Hence, the audio data (MIDI data or audio data converted from the MIDI data) processed by the data processing section 203 is sent to the bus 9 through the interface section 206 under the control of the central control unit 207.

Figure 5:
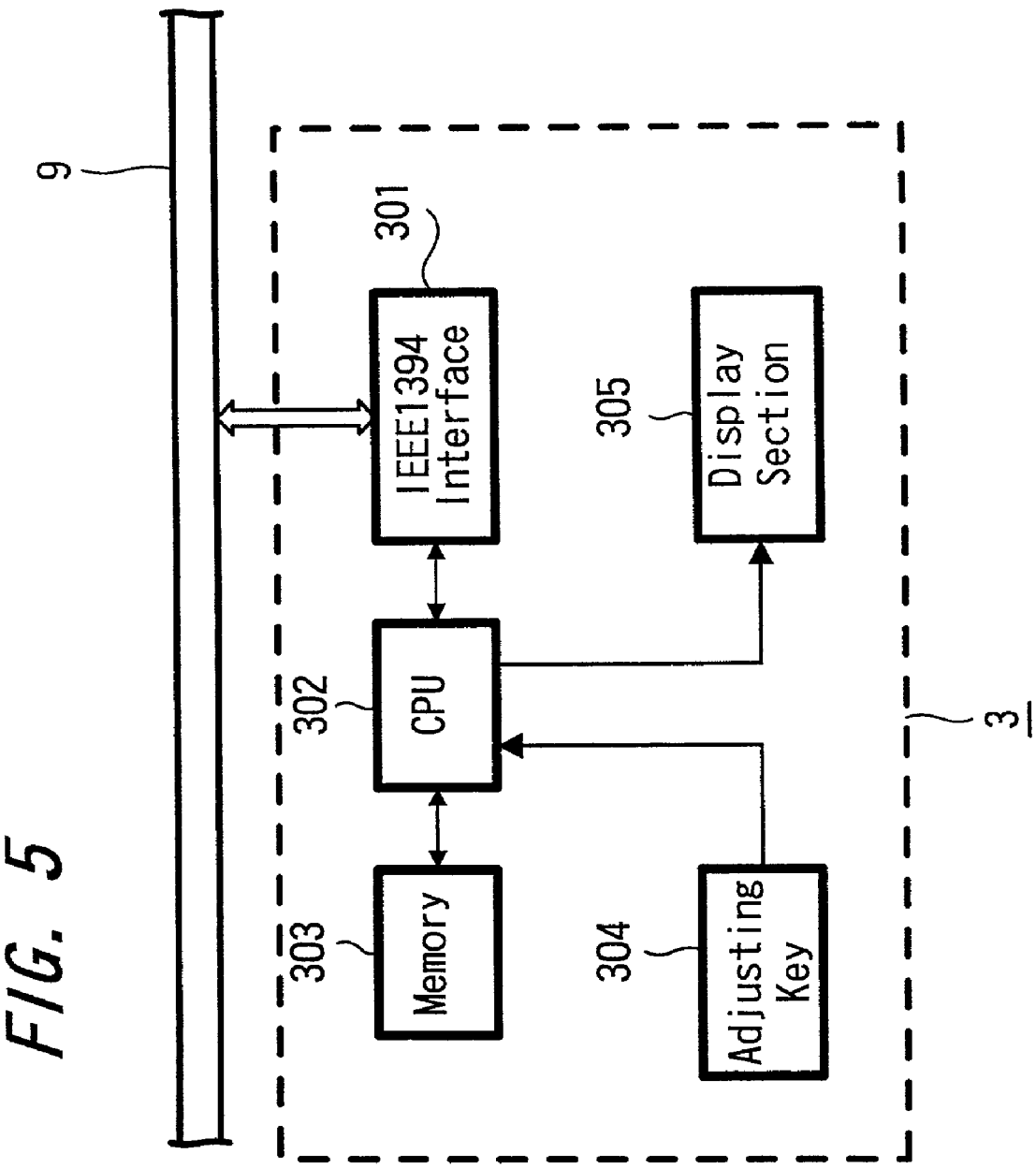
FIG. 5 is a block diagram depicting an example arrangement of a control console in accordance with one embodiment of the present invention.

FIG. 5 is a view showing an example arrangement of the control console 3. The control console 3 includes an IEEE 1394 interface section 301 for establishing a connection with the bus 9, a central control unit 302 for controlling data transmission through the interface section 301 and adjusting supplied audio data, a memory 303 for storing data necessary for the central control unit 302 to effect the control and data related to the adjustment status, an adjusting key 304 with which the user inputs the adjustment status, and a display section 305 for displaying the adjustment status. Hence, the audio data received at the interface section 301 is stored temporarily in the memory 303, and processed by the central control unit 302 based on the manipulation of the adjusting key 304. The audio processing effected herein includes processing in regard to the level, sound quality, channel structure, added reverberation, etc. The processed audio data is sent to the bus 9 through the interface section 301.

Instead of adjusting the audio data within the control console 3 as discussed above, the central control unit 302 may issue a control command to an audio signal source (microphone, electronic music instrument, etc.) based on the adjustment status by the adjusting key 304 to be transmitted to the corresponding audio signal source from the interface section 301 through the bus 9, so that the audio data is adjusted within the audio signal source.

Figure 6:
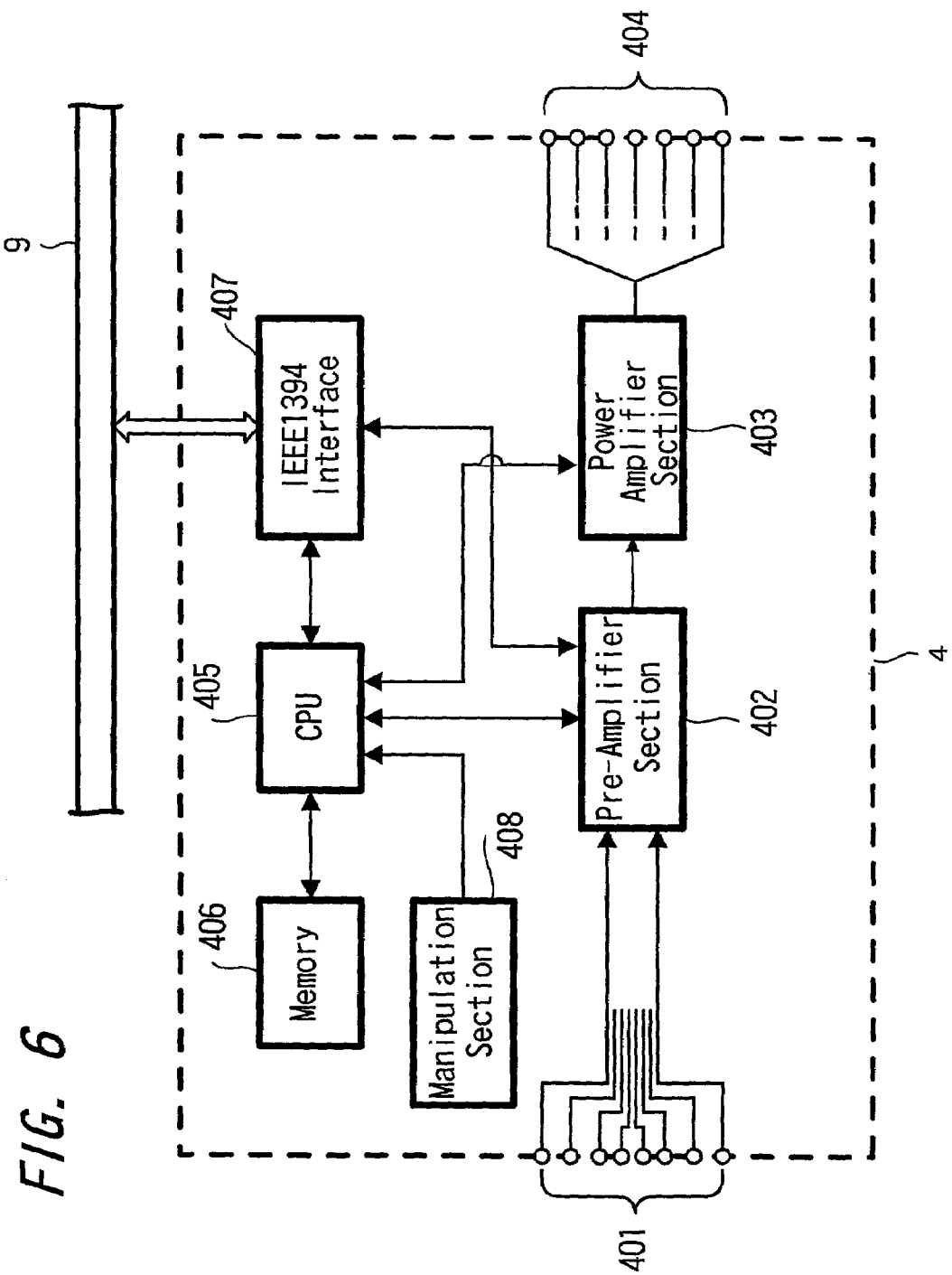
FIG. 6 is a block diagram depicting an example arrangement of an amplifier device in accordance with one embodiment of the present invention.

FIG. 6 is a view showing an example arrangement of the amplifier device 4. The amplifier device 4 supplies an pre-amplifier section 402 with a signal selected from the audio signals (analog audio signal or digital audio signal) obtained at an input terminal section 401, and effects various kinds of audio processing, such as the set-up of a sound field, adjustment of the sound quality, and pre-amplification. The processing within the pre-amplifier section 402 is effected either digitally or analogously, and in the present embodiment, the pre-amplifier section 402 outputs an analog audio signal.

The audio signal processed by the pre-amplifier section 402 is supplied to a power amplifier section 403, which amplifies the audio signal to a relatively large output to drive the speaker devices. The amplified audio signal is supplied to the speaker devices (for example, the speaker devices 8L, 8R, 8SL, and 8SR shown in FIG. 1) through speaker connecting terminals 404, so that the audio is outputted.

The processing actions within the amplifier device are effected under the control of a central control unit 405. Also, data transmission from an IEEE 1394 interface section 407 to the bus 9 and data receipt at the interface section 407 from the bus 9 are effected under the control of the central control unit 405. The central control unit 405 is connected to a memory 406 for storing data necessary to effect the control. Also, manipulation data of a manipulation section 408 provided with manipulation keys and the like is supplied to the central control unit 405, so that the input switching action, set-up of the sound quality, etc. are effected based on the manipulation data.

Also, when the audio data is received at the IEEE 1394 interface section 407 via the bus 9, the audio data is supplied to the pre-amplifier section 402 and processed in the same manner as the audio signal obtained at the input terminal section 401, so that the audio is outputted from the speaker devices connected to the terminal (sections) 404.

Figure 7:
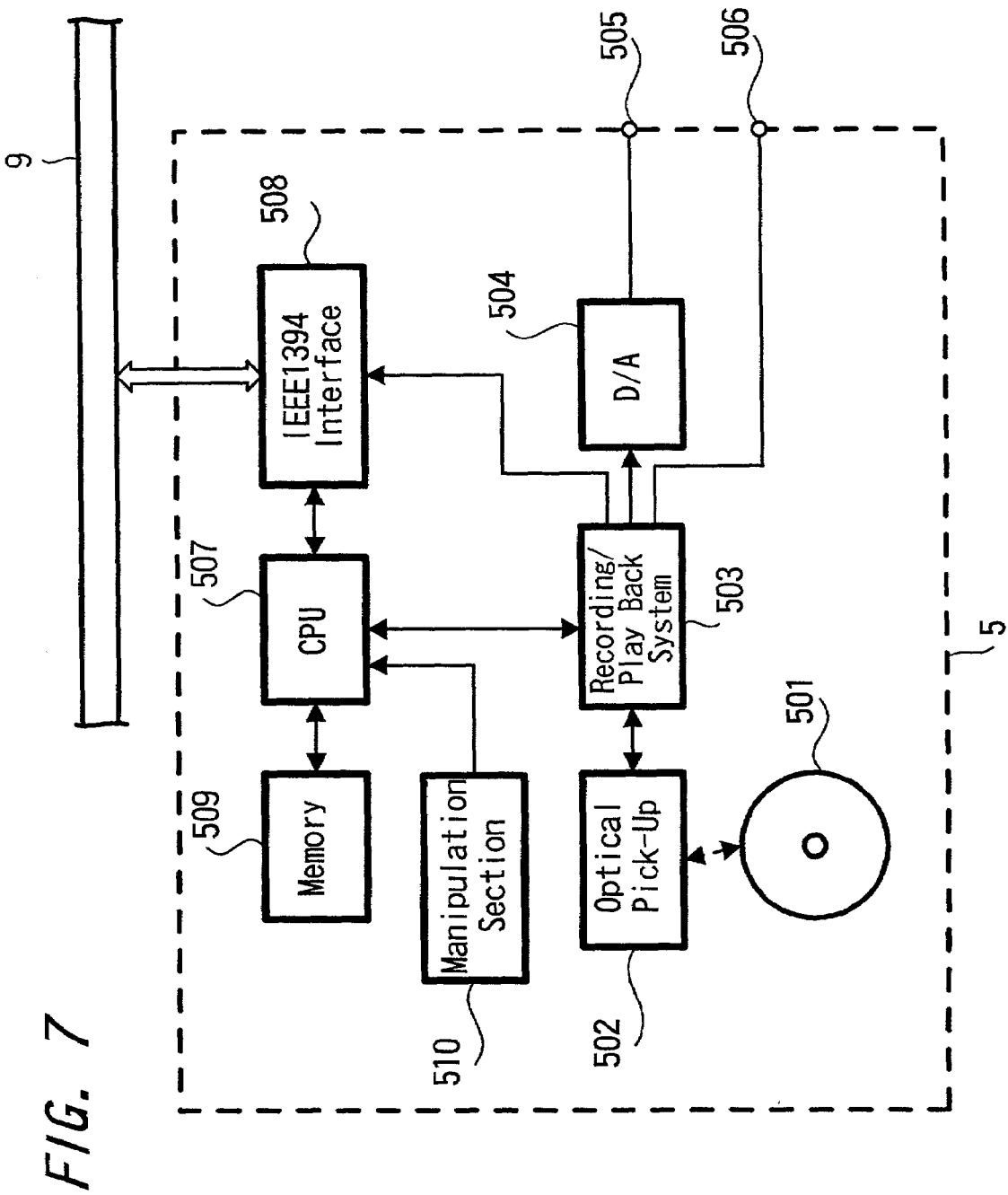
FIG. 7 is a block diagram depicting an example arrangement of a disk play back device in accordance with one embodiment of the present invention.

FIG. 7 is a view showing an example arrangement of the interior of the disk play back device 5. The disk play back device 5 referred to herein is an audio play back device for reproducing audio data recorded in a recording medium (optical disk) called a compact disk (CD).

A signal recorded in an optical disk 501 inserted in the disk play back device 5 is read out optically by an optical pick-up 502, and the signal read out by the optical pick-up 502 is supplied to a recording/play back system circuit 503, by which reproducing data (digital audio data) is obtained by effecting reproduction processing, such as data conversion and error correction. The reproducing data is converted to an analog audio signal by a digital-to-analog converter 504 and outputted through an analog output terminal 505 so as to be supplied to an audio device connected to the terminal 505. Also, the digital audio data obtained by the recording/play back system circuit 503 is outputted through a digital output terminal 506. Further, the reproducing data obtained by the recording/play back system circuit 503 is supplied to an IEEE 1394 interface section 508, so that it is outputted to the connected bus 9 as stream data.

The reproducing action from the disk is effected under the control of a central control unit 507. Also, data transmission from the IEEE 1394 interface section 508 to the bus 9 and data receipt at the interface section 508 from the bus 9 are effected under the control of the central control unit 507. The central control unit 507 is connected to a memory 509 for storing data necessary to effect the control. In addition, manipulation data of a manipulation section 510 provided with manipulation keys, such as a reproducing key, is supplied to the central control unit 507.

Figure 8:
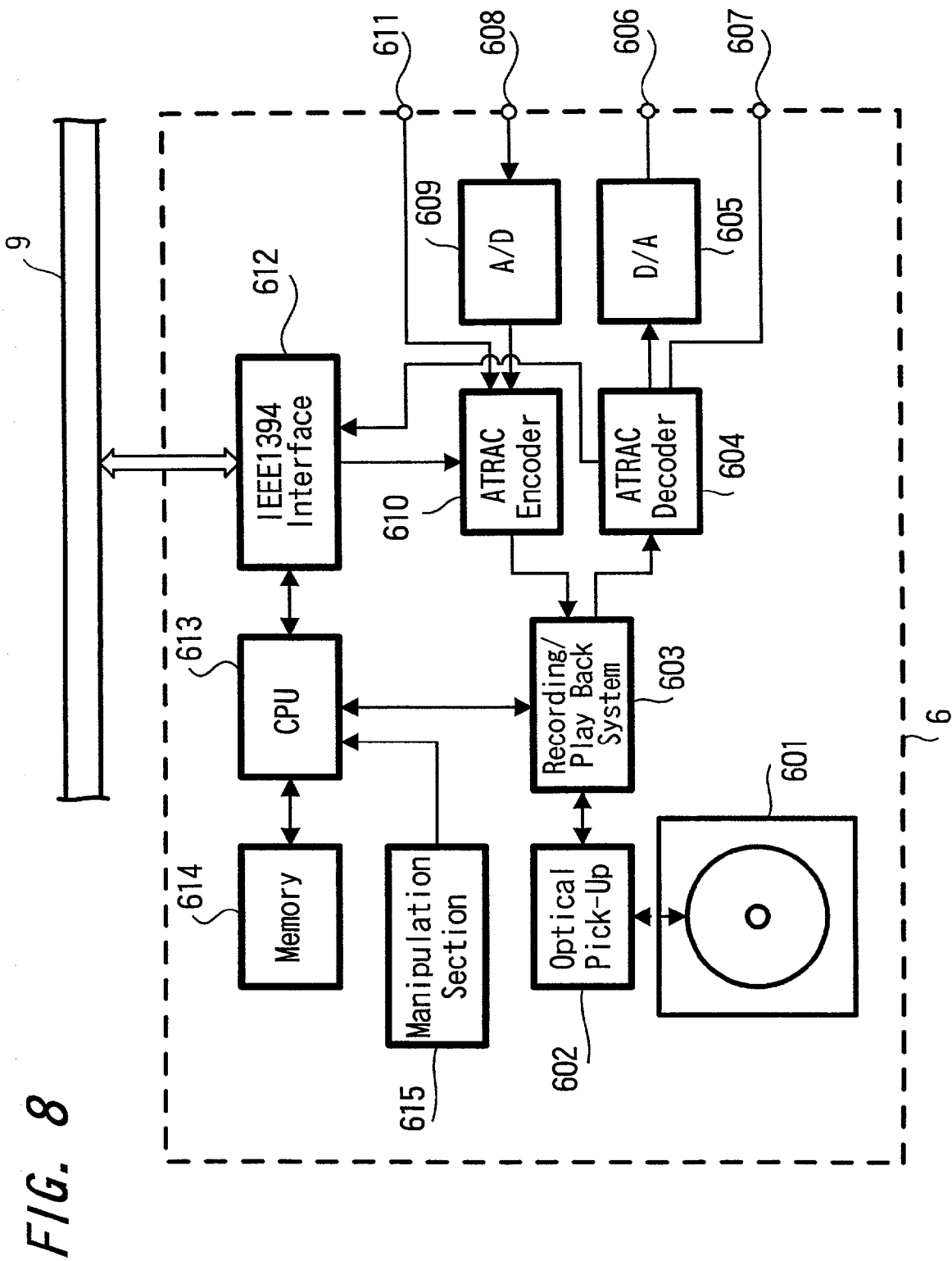
FIG. 8 is a block diagram depicting an example arrangement of a disk recording/play back apparatus in accordance with one embodiment of the present invention.

FIG. 8 is a view showing an example arrangement of the interior of the disk recording/play back device 6. The disk recording/play back device 6 referred to herein is an audio recording/play back device for encoding audio data by means of predetermined compression coding (ATRAC method: Adaptive Transform Acoustic Coding) and recording the encoded data in a medium, such as a magneto-optic disk called a mini disk (MD), and reproducing the encoded data from the medium.

More specifically, a signal recorded in a specific magneto-optic disk (or optical disk) 601 is read out optically by an optical pick-up 602, and the signal read out by the optical pick-up 602 is supplied to a recording/play back system circuit 603 to be processed therein, whereby ATRAC reproducing data is obtained. Then, the reproducing data is decoded by an ATRAC decoder 604 to restore the original audio data, and the restored original audio data is converted to an analog audio signal by a digital-to-analog converter 605, after which the analog audio signal is outputted through an analog output terminal 606 to be supplied to an audio device connected to the terminal 606. Also, the digital audio data decoded by the ATRAC decoder 604 is outputted through a digital output terminal 607. Further, the ATRAC reproducing data (or reproducing data decoded from the ATRAC data) supplied to the ATRAC decoder 604 is supplied further to an IEEE 1394 interface section 612 so as to be sent to the connected bus 9.

The following description will give an explanation of the arrangement of the recording system. That is, an analog audio signal obtained at an analog input terminal 608 is converted to digital audio data by an analog-to-digital converter 609, and the converted audio data is supplied to an ATRAC encoder 610 so as to be encoded therein by means of ATRAC. The audio data encoded by means of ATRAC by the ATRAC encoder 610 is supplied to the recording/play back system circuit 603 and processed therein so as to be converted to a recording signal. Then the recording signal is supplied to the optical pick-up (section) 602, and recorded in the magneto-optic disk 601. Also, the digital audio data (digital audio data encoded by means of ATRAC or raw digital audio data which is not subjected to compressed coding) supplied to an IEEE 1394 interface section 612 from the bus 9 is also supplied to the recording/play back circuit system 603 through the ATRAC encoder 610 so as to be recorded in the magneto-optic disk 601.

The reproducing action and recording action by the foregoing circuits are effected under the control of a central control unit 613. Also, data transmission from the IEEE 1394 interface section 612 to the bus 9, and data receipt at the interface section 612 from the data bus 9 are effected under the control of the central control unit 613. The central control unit 613 is connected to a memory 614 for storing data necessary to effect the control. Also, manipulation data of a manipulation section 615 provided with manipulation keys, such as a recording key and a reproducing key, is supplied to the central control unit 613.

Figure 9:
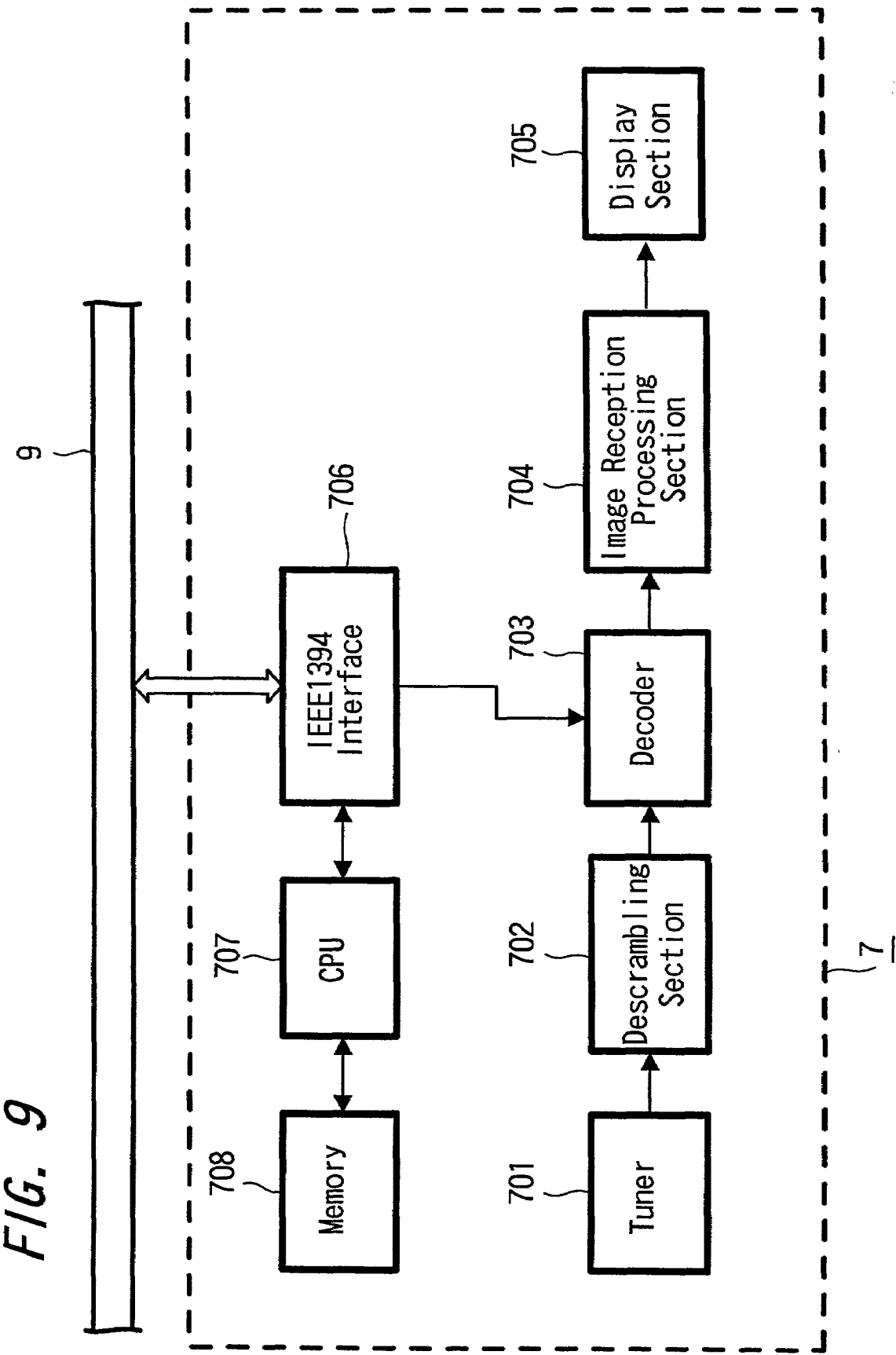
FIG. 9 is a block diagram depicting an example arrangement of a display device in accordance with one embodiment of the present invention.

FIG. 9 is a view showing an example arrangement of the display device 7. The display device 7 is formed as a TV receiver, and therefore, includes a tuner 701 connected to an antenna or the like, a descrambling section 702 for descrambling the scramble on a broadcast signal received by the tuner 701, a decoder 703 for decoding the received data descrambled by the descrambling section 702, an image reception processing section 704 for applying image reception processing to the data decoded by the decoder 703, and a display section 705 supplied with an output from the image reception processing section 704. Image display means of various kinds, such as a cathode ray tube and a liquid crystal display panel, can be used as the display section 705.

Also, image data supplied to an IEEE 1394 interface section 706 from the bus 9 is supplied to the image reception processing section 704 through the decoder 703 so as to be displayed on the display section 705. A display pattern in this case is, for example, such that image data supplied via the bus 9 is displayed across the screen, or an image supplied via the bus 9 is displayed in a sub-screen while television broadcast received by the display section 7 is displayed on the main screen. The display pattern is either set by the manipulation within the display device 7 or specified by auxiliary data contained in the image data transmitted via the bus 9.

Each of the devices 1 through 7 linked to the bus 9 is referred to as a unit, and allowed to control any other unit by reading/writing information stored in any other unit by using a descriptor defined by the AV/C Digital Interface Command Set General Specification (hereinafter, referred to as AV/C) in the AV/C Command Transaction Set. The AV/C is disclosed in detail at http://www.1394TA.org.

Each unit linked to the bus 9 is also called a node and assigned with a node ID, so that the data sender and data receiver on the bus are identified by these node IDs. Upon detection that a new device is linked to the bus 9 or the linked device is released, the bus reset is triggered and the node IDs are set anew. Hence, when the bus reset occurs, a different node ID may be reassigned to each device.

Figure 10:
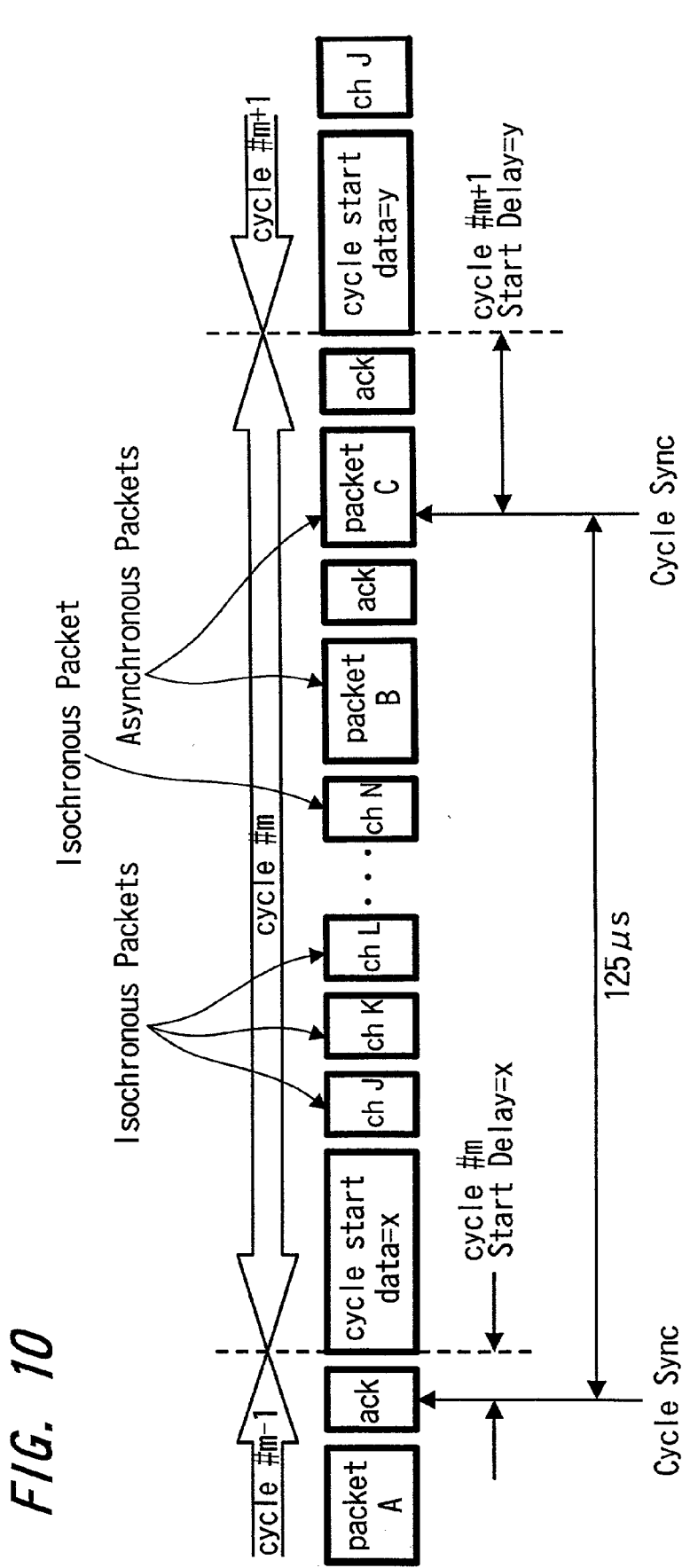
FIG. 10 is an explanatory view showing an example of a transmission status by the IEEE 1394 scheme.

Next, the following description will describe the data transmission status via the IEEE 1394 bus 9 to which the devices 1 through 7 are linked. A signal is transmitted to/from each device by time-division multiplexing for each predetermined communication cycle (for example, 125 μsec) as shown in FIG. 10, for instance. The transmission of the signal is started when a device called a cycle master (an arbitrary device on the bus 9) sends a cycle start packet indicating the start of the communication cycle onto the bus. The cycle master is determined automatically by the procedure defined by the IEEE 1394 standards when each device is linked to a cable forming the bus.

Communication in one communication cycle can take two forms: the isochronous transmission (Iso-transmission) for transmitting data that should be transmitted in real time, such as video data and audio data, and the asynchronous transmission (Async-transmission) for transmitting a control command or auxiliary data in a reliable manner. During each communication cycle, an Iso-packet for the isochronous transmission is transmitted before an Async-packet for the asynchronous transmission. All the Iso-packets transmitted in one communication cycle are assigned with channel numbers 1, 2, 3, . . . , n, respectively, so that a plurality items of Iso-transmission data can be distinguished one from the others. A period since the completion of the communication of the Iso-packets until the transmission of the following cycle start packet is used for transmission of the Async-packets. Thus, the period during which the Async-packets can be transmitted varies with the number of the transmission channels of the Iso-packets. Also, the Iso-packets are transmitted in the transmission scheme where the bandwidth (channel number) reserved for each communication cycle is secured, but acknowledgement from the receiver's end is not required. On the other hand, when the data is transmitted by the Async-packets, data of acknowledgement (Ack) is returned from the receiver's end, so that transmission is carried out in a reliable manner by a checking the transmission status.

Figure 11:
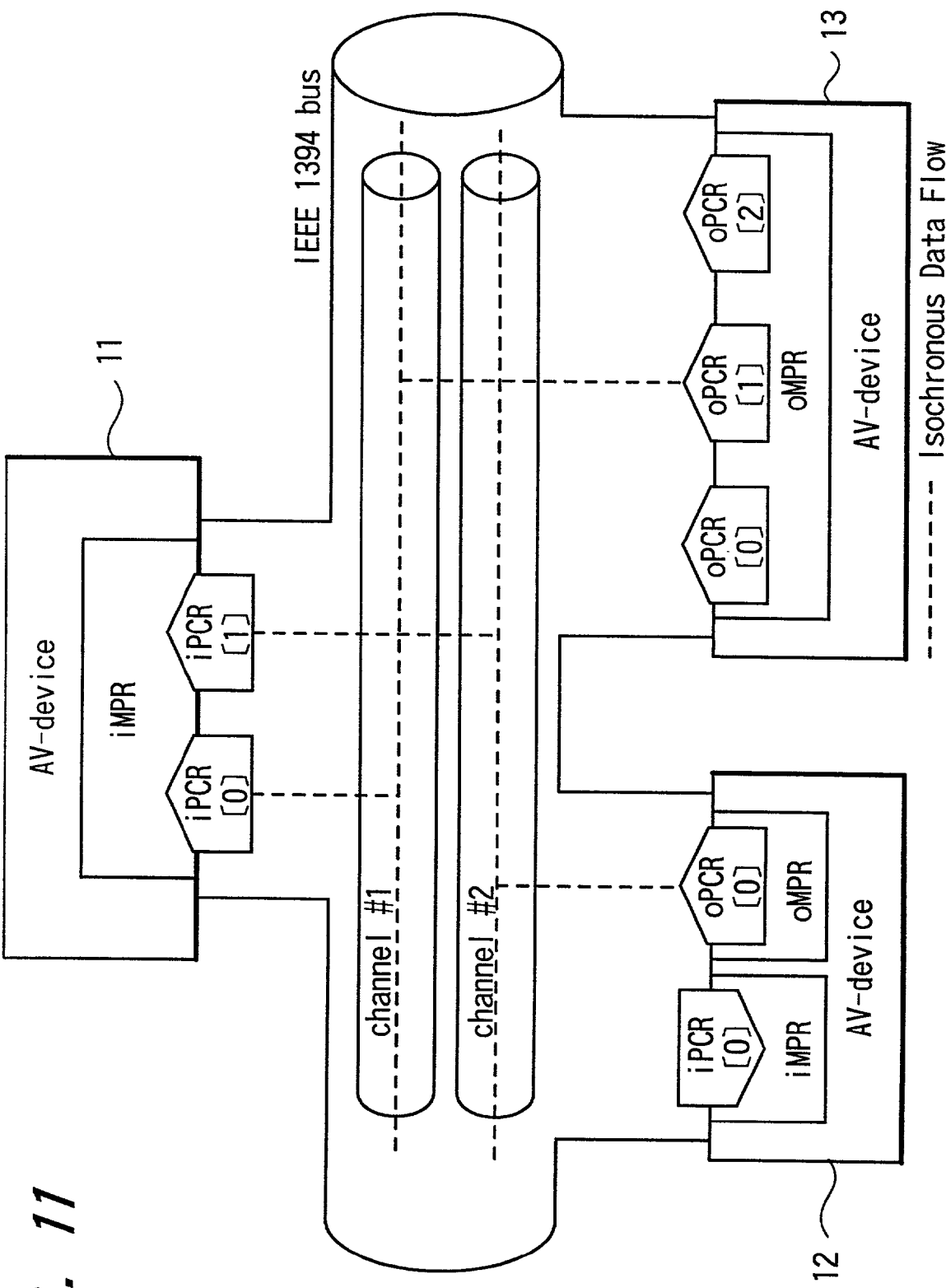
FIG. 11 is an explanatory view showing example set-up of a transmission path on an IEEE 1394 bus.

FIG. 11 is a view showing a relation among plugs, plug control registers, and the isochronous channels necessary for the data transmission on the bus. The AV devices (AV-devices) 11 through 13 as bus-linked devices are interconnected via an IEEE 1394 serial bus. Of all the oPCR [0] through oPCR [2] whose transmission rates and the oPCR number are defined by oMPR of the AV device 13, the isochronous data assigned with the channel by oPCR [1] is sent to the channel #1 in the IEEE 1394 serial bus. Of iPCR [0] and iPCR [1] whose transmission rates and the iPCR number are defined by iMPR of the AV device 11, the AV device 11 reads and takes in the isochronous data sent via the channel #1 in the IEEE 1394 serial bus by iPCR [0] assigned with an input channel #1 at the defined transmission rate. Likewise, the AV device 12 sends the isochronous data to the channel #2 assigned by oPCR [0], and the AV device 11 reads and takes in the isochronous data from the channel #2 assigned by iPCR [1].

In this manner, it is arranged in such a manner that the data outputted to the bus through the output plug of the data sender device is received through the input plug of the data receiver device through the secured channel. The job of establishing a connection by setting up the channel and plug is effected under the control of a predetermined bus-linked device (controller).

Figure 12:
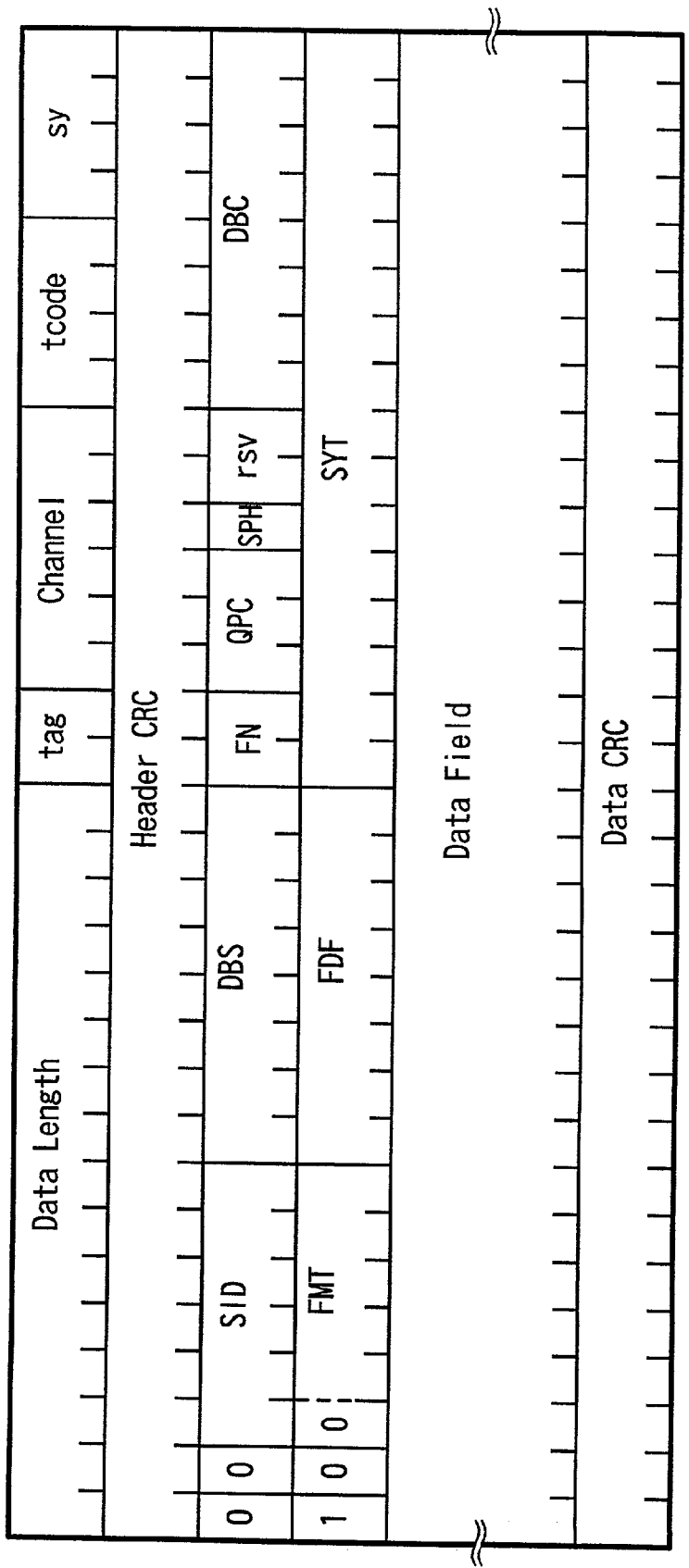
FIG. 12 is an explanatory view showing an example arrangement of a packet used for data transmission in accordance with one embodiment of the present invention.

FIG. 12 is a view showing an arrangement of one packet as the isochronous packet (Iso-packet) transmitted via the isochronous channel set on the bus 9 as has been discussed above. The header including the data length, tag, and channel necessary for the transmission, and a header error correcting code (CRC: Cyclic Redundancy Check) for correcting an error in the header are placed in the head portion of the packet. The header portion is of the format defined by the IEEE 1934-1995 standards.

The following data section is of the audio music data transmission format defined by the IEC 61883 standards. According to the foregoing standards, the first 64-bit section is allocated as the header portion, and the last 32-bit section is allocated as the data error correcting code (CRC), leaving all the rest as data field. Herein, the data is identified as the audio music data by the FMT data within the data in the header section. Also, the data is identified as the data of the AM 824 standards by the FDF data. In case of the data of the AM 824 standards, one unit of data placed in the data field is composed of 32 bits, and an arbitrary number of 32-bit units are placed in the data field. In this case, the first 8 bits within the 32-bit unit are allocated as the label data, and the rest of 24 bits are the actual transmission data, such as the audio data.

Figures 13, 14:
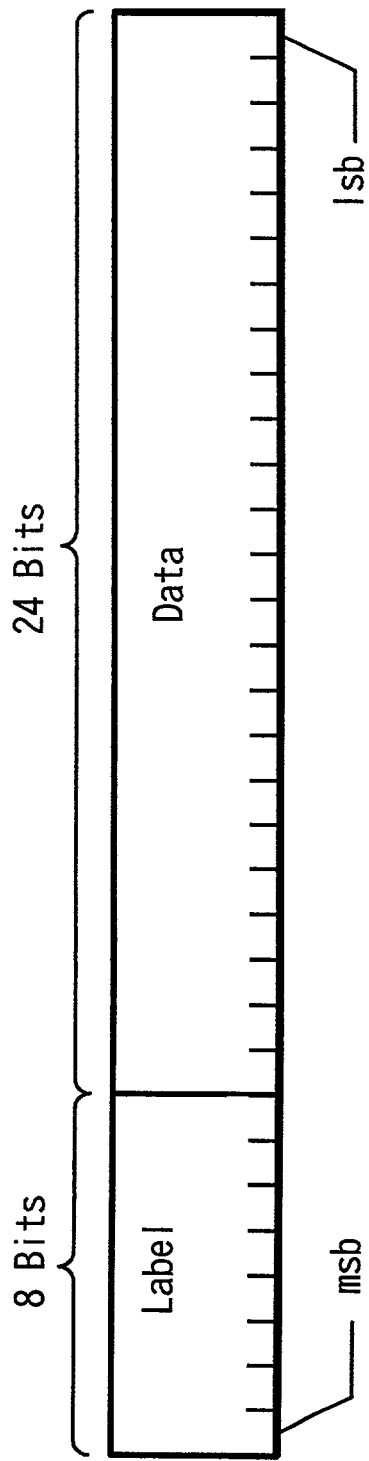
FIG. 13 is an explanatory view showing an example transmission data structure in accordance with one embodiment of the present invention.
FIG. 14 is an explanatory view showing an example of label data in accordance with one embodiment of the present invention.

FIG. 13 is a view showing the data structure of the 32-bit unit. The first 8 bits are allocated as the label data that specifies the data format of the following data or the like, and the audio data or the like is placed in the last 24-bit section. For example, in case of the audio data having a 16-bit sample, one sample of the audio data is placed in 16 bits within the 24-bit section.

FIG. 14 is a view showing example label data. The example is shown in correspondence with 2-digit hexadecimal values expressed by 8 bits. When the label data shows a value within a range from "00" to "3F", the audio data in the IEC 60958 format is placed in the section following the label data. When the label data shows a value within a range from "40" to "4F", the multi-bit linear audio data is placed in the section following the label data. When the label data shows a value within a range from "50" to "5F", 1-bit linear audio data is placed in the section following the label data. When the label data shows a value within a range from "80" to "8F", the music instrument data of the MIDI standards is placed in the section following the label data. Further, when the label data shows a value within a range from "C0" to "EF", the auxiliary data related to the audio data is placed in the section following the label data.

In the present embodiment, if one specific kind of data in the auxiliary data is used as the label data, data related to the spatial placement of the multi-channel audio data when transmitting the same is specified.

FIG. 15 is a view showing examples when the data related to the spatial placement of the audio data is transmitted. In each example shown in FIG. 15, one specific kind of data in the auxiliary data label is used as the label data, and the first 8 bits out of the 24 bits following the label data are allocated as the sub label data, which is used as the data specifying the spatial placement.

A capital letter A in FIG. 15 is an example when the data related to the speaker position is placed, and the data identifying as being the speaker position A is placed in the sub label data. The rest of 16-bit section is divided into 1-bit sections, so that 16 items of data, $S_0$, $S_1$, $S_2$, $S_3$, $S_4$, $S_5$, $S_6$, $S_7$, $S_8$, $S_9$, $S_A$, $S_B$, $S_C$, $S_D$, $S_E$, and $S_F$ are placed. These 16 items of data, $S_0$ through $S_F$, are the data related to the positioning of 16 speakers.

Figure 16:
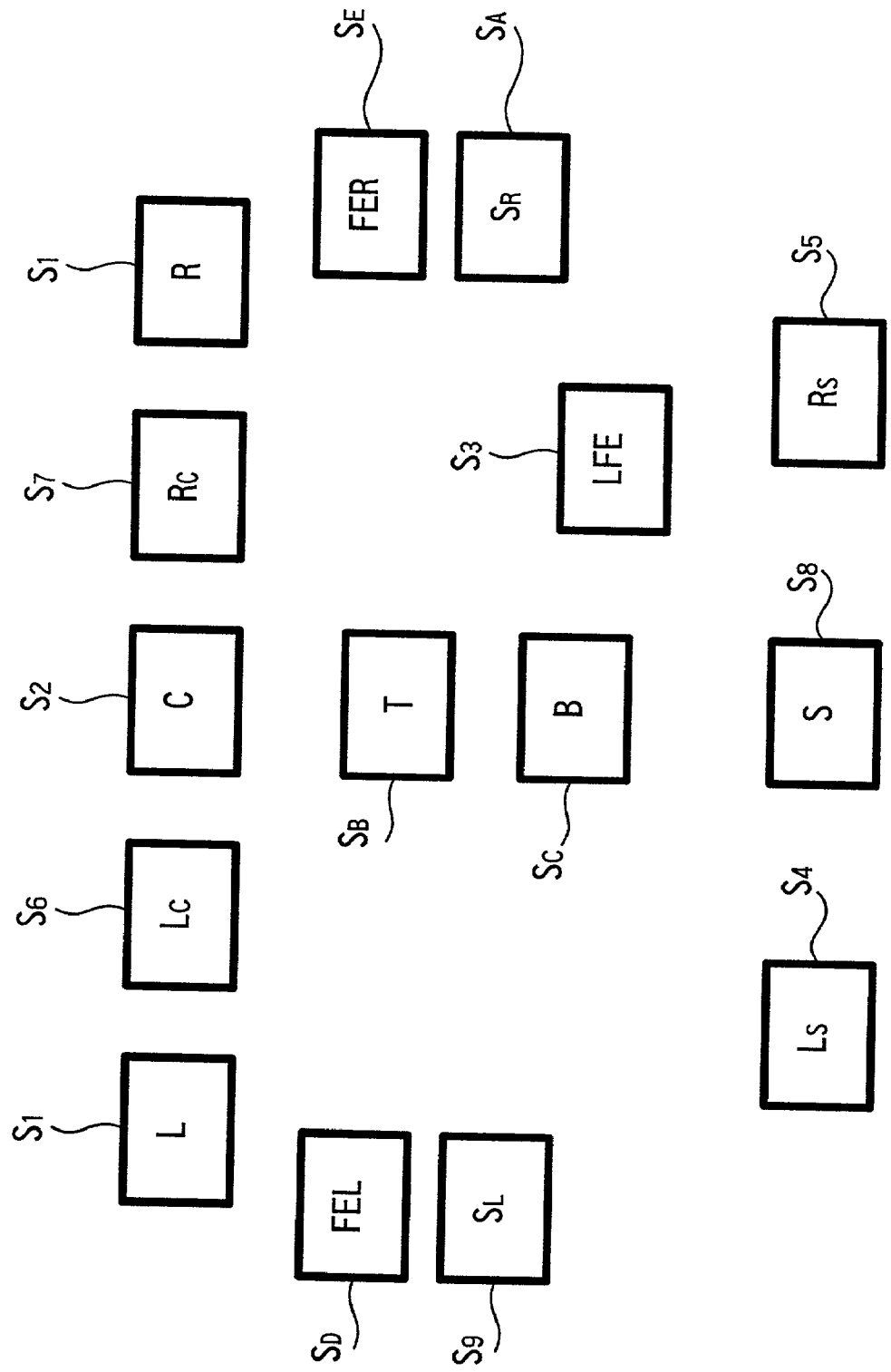
FIG. 16 is an explanatory view showing example speaker positioning in accordance with one embodiment of the present invention.

More specifically, the multi-channel audio data up to 16 channels can be transmitted, and when the speakers for 15 channels out of the 16 channels are positioned, the speaker for each channel is positioned in the manner shown in FIG. 16, for example. The explanation of each channel will be given with reference to FIG. 16. The data $S_0$ is defined as the data for the speaker of the front left channel; the data $S_1$ for the speaker of the front right channel; the data $S_2$ for the speaker of the center channel; the data $S_3$ for the speaker of the low frequency channel (LFE channel); the data $S_4$ for the speaker of the rear left channel; the data $S_5$ for the speaker of the rear right channel; the data $S_6$ for the speaker of the center left channel; the data $S_7$ for the speaker of the center right channel; the data $S_8$ for the speaker of the surround channel; the data $S_9$ for the speaker of the side left channel; the data $S_A$ for the speaker of the side right channel; the data $S_B$ for the speaker of the top channel (the channel placed at the top); the data $S_C$ for the speaker of the bottom channel (channel placed at the bottom); the data $S_D$ for the speaker of the front left effect channel; and the data $S_E$ for the speaker of the front right effect channel. The channel of the data $S_F$ is undefined herein.

When data "1" is given as the data for each of the channels for the 16 bits, it means that the audio data to be outputted from the speakers of their respective channels is transmitted. When data "0" is given, it means that the audio data to be outputted from the speakers of their respective channels is not transmitted. More specifically, the data "1" is given to each of the data $S_0$ through $S_E$ except for the undefined data $S_F$, then it specifies the multi-channel audio data that positions the speakers for 15 channels in the structure as shown in FIG. 16. When the number of the used (placed) speakers decreases from the foregoing status, the data "1" for the speaker that no longer exists is updated to the data "0".

A capital letter B in FIG. 15 is another case when the data related to the speaker position is placed, and the data identifying as being the speaker position B is placed in the sub label data. In this case, the 16-bit section is divided by 2-bit sections, so that eight items of data, $SS_0$, $SS_1$, $SS_2$, $SS_3$, $SS_4$, $SS_5$, $SS_6$, and $SS_7$ are placed. These eight items of data are the data related to the positioning of eight speakers.

More specifically, the existence of the speakers $S_0$, $S_1$, $S_2$, $S_3$, $S_4$, $S_5$, $S_6$, and $S_7$ for seven channels out of the speakers for the 15 channels shown in FIG. 16 is specified by the eight items of data, $SS_0$, $SS_1$, $SS_2$, $SS_3$, $SS_4$, $SS_5$, $SS_6$, and $SS_7$. In this case, 2-bit data is given to each channel, and when the data "00" is given, it means that there is no data for the corresponding channel (in other words, no speaker is positioned for the corresponding channel). When the data "01" is given, it means that there is data for the corresponding channel at the original sampling frequency, and when the data "10" is given, it means that there is data for the corresponding channel at half the original sampling frequency. The status when the data "11" is given remains undefined herein.

A capital letter C in FIG. 15 is a case when the data related to the recording channel is placed, and the data identifying as being the channel is placed in the sub label data. The rest of the 16-bit section is divided into 1-bit sections, so that 16 items of data, $C_0$, $C_1$, $C_2$, $C_3$, $C_4$, $C_5$, $C_6$, $C_7$, $C_8$, $C_9$, $C_A$, $C_B$, $C_C$, $C_D$, $C_E$, and $C_F$ are placed. These 16 items of data, $C_0$ through $C_F$, are the data related to the existence of 16 recording channels. When the data "1" is given as the data for each channel, it means that the data is the audio data for which the corresponding recording channel exists. When the data "0" is given, it means that the data is the audio data for which the corresponding recording channel does not exist.

A capital letter D in FIG. 15 is a case when the data related to the microphone position is placed, and the data identifying as being the microphone position is placed in the sub label data. The rest of the 16-bit section is divided into 1-bit sections, so that 16 items of data, $I_0$, $I_1$, $I_2$, $I_3$, $I_4$, $I_5$, $I_6$, $I_7$, $I_8$, $I_9$, $I_A$, $I^B$, $I_C$, $I_D$, $I_E$, and $I_F$ are placed. These 16 items of data, $I_0$ through $I_F$, are the data indicating, for example, the existence or absence of each channel for the audio data having up to 16 channels that has been recorded separately by up to 16 microphones installed on the stage in accordance with the predetermined spatial placement. When the data "1" is given as the data for each channel, it means that the data is the audio data for which the recording channel used in recording by the corresponding microphone exists. When the data "0" is given, it means that the data is the audio data for which the recording channel used in recording by the corresponding microphone does not exist.

Figure 17:
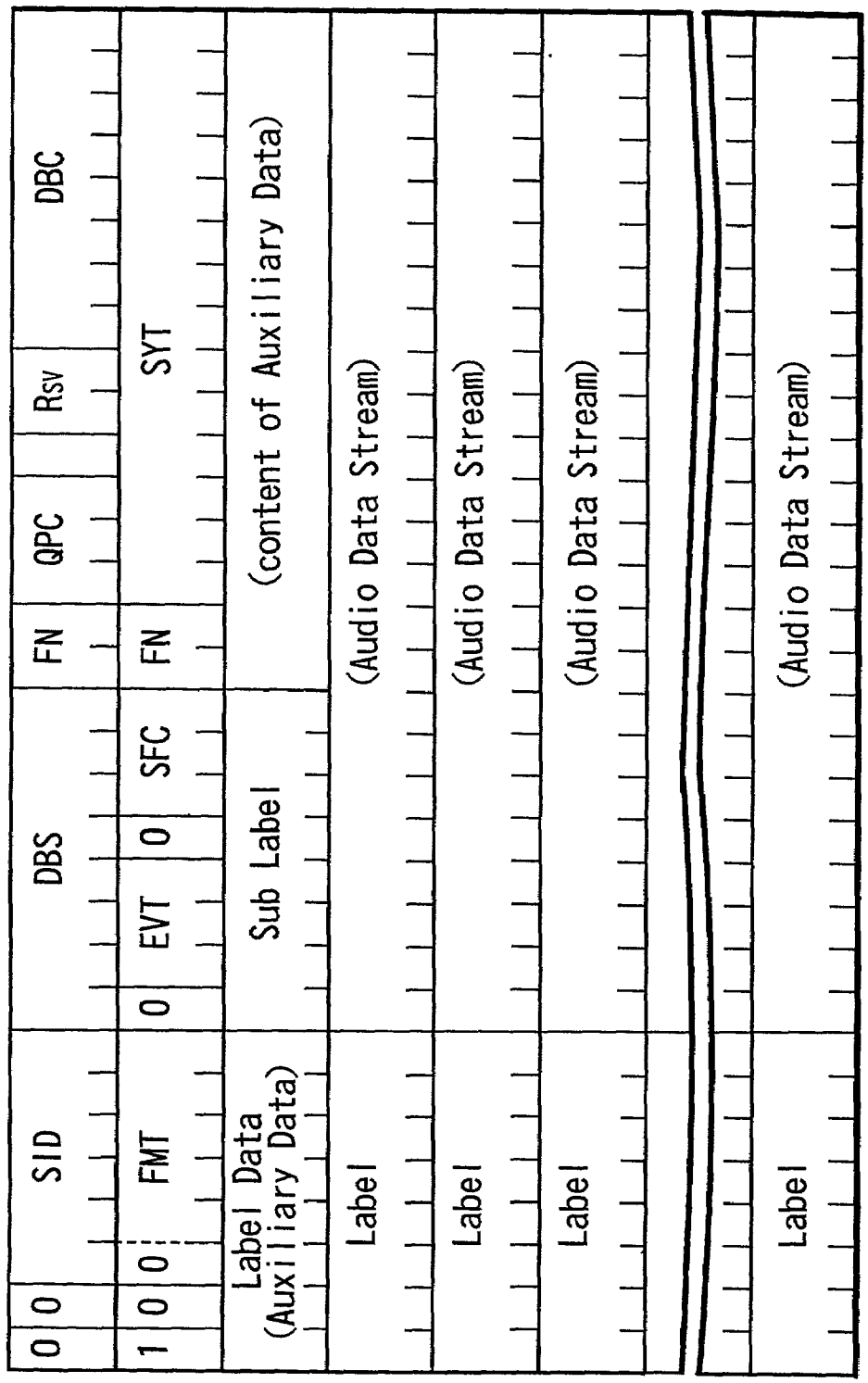
FIG. 17 is an explanatory view showing an example of data placement in accordance with one embodiment of the present invention.

FIG. 17 is a view showing an example when the auxiliary data of the foregoing structure is placed together with the audio data in the same packet. Herein, the auxiliary data is placed in the first 32-bit section in the data field of the packet, and the auxiliary data specifies the multi-channel structure, such as the speaker positions. An arbitrary number of 32-bit units of audio data (with the first 8 bits out of the 32 bits being the label data) are placed in the rest of the data field. When the audio data is the multi-channel audio data, the audio data for each channel is placed sequentially according to the predetermined channel placement.

The example shown in FIG. 17 was the case where only one kind of auxiliary data is placed in one packet. It should be appreciated, however, that more than one kind of auxiliary data can be placed in one packet. For example, two kinds of the auxiliary data including the auxiliary data related to the speaker positioning shown by the capital letter A or B in FIG. 15, and the auxiliary data related to the recording channel shown by the capital letter C in FIG. 15 may be placed in one packet simultaneously. Also, more than one kind of the auxiliary data related to different kinds of transmission data may be placed in one packet simultaneously. For example, data related to the copyright protection on the audio data may be transmitted as the auxiliary data simultaneously with the audio data per se.

The foregoing has explained the case of the auxiliary data when the audio data is transmitted. It should be appreciated, however, that the auxiliary data can be used when transmitting other kinds of data. For example, there may be a case where image data, such as still image data and motion image data, are reproduced from a recording medium by the disk play back device as the data accompanying with the audio data, and in this case, when the image data is transmitted to the bus 9 together with the audio data, the spatial placement of the image data when displayed may be specified by the auxiliary data.

FIG. 18 is a view showing examples when the data related to the spatial placement of the image data is transmitted as the auxiliary data. In each example shown in FIG. 18, one specific kind of data of the auxiliary data label is used as the label data, and the first 8 bits in the 24 bits following the label data are allocated as the sub label data, which is used as the data specifying the spatial placement of the image data when displayed.

A capital letter A in FIG. 18 is one example when the data related to the display position is placed, and the data identifying as being the display position A is placed in the sub label data. The rest of the 16-bit section is divided into 1-bit sections, so that 16 items of data, $D_0$, $D_1$, $D_2$, $D_3$, $D_4$, $D_5$, $D_6$, $D_7$, $D_8$, $D_9$, $D_A$, $D_B$, $D_C$, $D_D$, $D_E$, and $D_F$ are placed. These 16 items of data, $D_0$ through $D_F$, are 16 kinds of data related to the display of the image data or the like.

A capital letter B in FIG. 18 is another example when the data related to the display position is placed, and the data identifying as being the display position B is placed in the sub label data. The rest of the 16-bit section is divided into 2-bit sections, so that eight items of data, $DD_0$, $DD_1$, $DD_2$, $DD_3$, $DD_4$, $DD_5$, $DD_6$, and $DD_7$ are placed. These eight items of data, $DD_0$ through $DD_7$, are eight kinds of data related to the display of the image data, and the details of which are specified by four values, "00", "01", "10", and "11".

Figure 19:
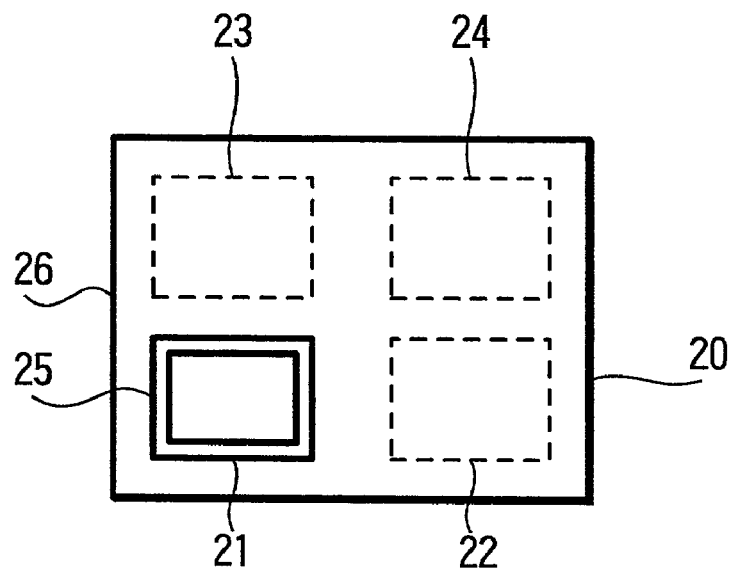
FIG. 19 is an explanatory view showing an example display (first example) in accordance with one embodiment of the present invention.

These four values are the data that specifies the display position when the image data transmitted together with the auxiliary data is displayed on one of the sub display screens in the main display screen 20 as shown in FIG. 19, for example. In other words, one position is specified from four display patterns including: a sub display screen 21 at the lower left, a sub display screen 22 at the lower right, a sub display screen 23 at the upper left, and a sub display screen 24 at the upper right.

Figure 20:
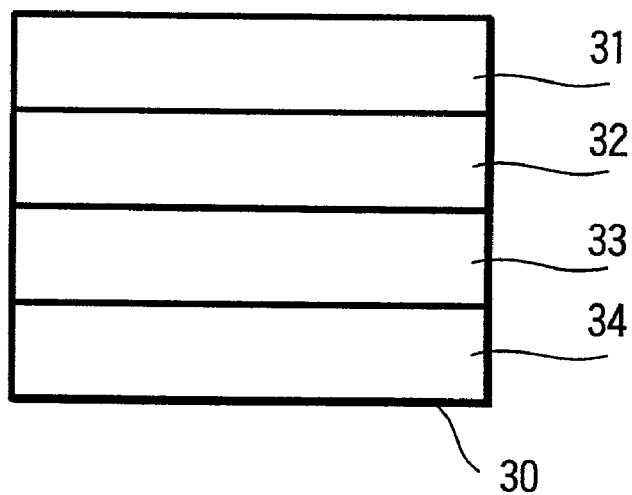
FIG. 20 is an explanatory view showing another example display (second example) in accordance with one embodiment of the present invention.

Alternatively, these four values are the data that specifies the display position when the image data transmitted together with the auxiliary data is displayed on one of landscape rectangular sub display screens in a main display screen 30 as shown in FIG. 20, for example. In other words, one position is specified from four-split landscape rectangular display positions 31, 32, 33, and 34.

A capital letter C in FIG. 18 shows still another case when the data related to the display position is placed, and the data identifying as being the display position C is placed in the sub label data. The rest of the 16-bit section is divided into 4-bit sections, so that four items of data, $DDD_0$, $DDD_1$, $DDD_2$, and $DDD_3$ are placed. These four items of data, $DDD_0$ through $DDD_3$, are four kinds of data related to the display of the image data, and the details of which are specified by eight 3-bit values.

By specifying the display position with eight values in the above case, the display pattern can be specified more specifically. In other words, as shown in FIG. 19, for example, when the sub display screen 21 is displayed, a display color of a display frame 25 can be specified, or the shape of the sub screen display 21 (circle, ellipse, etc. besides the rectangle as shown in the drawing) can be specified.

Also, more than one item may be specified for one display screen (sub display screen) by the data, $D_0$ through $D_F$, $DD_0$ through $DD_7$, and $DDD_0$ through $DDD_3$ indicated by the capital letters A, B, and C in FIG. 18, respectively. For example, it may be arranged in the following manner. That is, the display position of the sub display screen is specified by the data $DDD_0$ and the shape of the sub display screen is specified by the data $DDD_1$ both indicated by the capital letter C in FIG. 18. Also, the display color of the frame of the sub display screen is specified by the data $DDD_2$, and the gradation across the sub display screen is specified by the data $DDD_3$ both indicated by the capital letter C in FIG. 18.

In the foregoing case where the auxiliary data related to the display pattern of the image data is transmitted, the auxiliary data may be placed at the head portion in the data field followed by the image data in the same manner as the packet structure when transmitting the audio data as shown in FIG. 17, for example. Alternatively, when transmitting the foregoing image data and auxiliary data thereof simultaneously with the audio data and auxiliary data thereof that were explained with reference to FIGS. 15 through 17, the placement of data can be modified in various manners. For example, the auxiliary data of the audio data may be placed at the head portion in the data field in each packet followed by the auxiliary data of the image data, audio data, and image data in this order.

By transmitting the data, such as the multi-channel audio data, after placing the identification data (data in the sub label) related to the spatial placement of the transmission data, such as the data related to the spatial placement of the speaker positioning of the audio data, by using the auxiliary data in the above manner, and placing the data related to the set-up of the transmission data following the identification data, the detail of the channel structure and display pattern can be readily judged at the receiver's end by merely referring to the auxiliary data.

The devices linked to the IEEE 1394 bus as shown in FIGS. 1 and 2 in the foregoing embodiment were examples only, and it should be appreciated that the present invention can be adapted when other kinds of audio devices or video devices are interconnected via the bus so as to transmit the audio data or image data among the bus-linked devices.

In addition, the foregoing embodiment explained a case where the audio data is transmitted or the image data accompanying the audio data is transmitted. It should be appreciated, however, that the present invention can be adapted to a case where the image data alone is transmitted or other kinds of stream data is transmitted.

In addition, it goes without saying that the data transmission path can be other than the IEEE 1394 bus line.

According to a transmitting method of a first aspect of the present invention, not only can the spatial placement of the transmission data be judged by the identification data placed in the first section within the auxiliary data, but also the details of the set-up of the transmission data can be judged by the data placed in the second section. Consequently, it has become possible to judge the spatial placement and the details of the set-up of the transmission data by merely detecting the auxiliary data.

With a transmitting method of a second aspect of the present invention according to the first aspect, the transmission data is audio data, and the identification data in the first section is data related to positioning of a speaker for each channel. Consequently, the set-up of the audio data can be readily judged at the receiver's end when transmitting multi-channel audio data having various kinds of speakers.

With a transmitting method of a third aspect of the present invention according to the first aspect, the transmission data is audio data, and the data related to the set-up in the second section is data related to a sampling frequency of each channel prepared. Consequently, the sampling frequency of the transmission data can be readily judged when transmitting multi-channel audio data including data having a plurality of sampling frequencies.

With a transmitting method of a fourth aspect of the present invention according to the first aspect, the transmission data is audio data, and the identification data in the first section is identification data related to spatial placement of a recording channel and the data related to the set-up in the second section is data that indicates one of existence and absence of the recording channel for each channel. Consequently, the existence of the respective recording channels can be readily judged by merely referring to the auxiliary data when transmitting the multi-channel audio data.

With a transmitting method of a fifth aspect of the present invention according to the first aspect, the transmission data is image data, the identification data in the first section is data related to a placement position to display the image data, and the data related to the set-up in the second section is data that specifies a display pattern of the image data. Consequently, the display pattern of the transmitted image data can be judged readily.

With a transmitting apparatus of a sixth aspect of the present invention, the spatial placement of the transmission data can be judged by the data in the first section within the auxiliary data, and the set-up of the transmission data can be judged by the data in the second section. Consequently, when the data transmitted from the transmitting apparatus is received, the spatial placement and the detail of the set-up of the transmission data can be readily judged by referring to the auxiliary data.

With a transmitting apparatus of a seventh aspect of the present invention according to the sixth aspect, the transmission data obtained by the data input means is multi-channel audio data, and the identification data in the first section within the auxiliary data generated by the transmission data generating means is data related to positioning of a speaker for each channel. Consequently, when the multi-channel audio data having various kinds of speakers is sent from the transmitting apparatus, the set-up of the audio data can be readily judged at the receiver's end.

With a transmitting apparatus of an eighth aspect of the present invention according to the sixth aspect, the transmission data obtained by the data input means is multi-channel audio data, and the data related to the set-up in the second section within the auxiliary data generated by the transmission data generating means is data related to a sampling frequency of each channel prepared. Consequently, when the multi-channel audio data including data having a plurality of sampling frequencies is sent from the transmitting apparatus, the sampling frequencies of the transmission data can be readily judged at the receiver's end.

With a transmitting apparatus of a ninth aspect of the present invention according to the sixth aspect, the transmission data obtained by the data input means is multi-channel audio data, and the identification data in the first section within the auxiliary data generated by the transmission data generating means is identification data related to spatial placement of a recording channel, and the data related to the set-up in the second section is data that indicates one of existence and absence of the recording channel for each channel. Consequently, when the multi-channel audio data is sent from the transmitting apparatus, the existence of the respective recording channels can be readily judged at the receiver's end by merely referring to the auxiliary data.

With a transmitting apparatus of a tenth aspect of the present invention according to the sixth aspect, the transmission data obtained by the data input means is image data, and the identification data in the first section within the auxiliary data generated by the transmission data generating means is data related to a placement position to display the image data, and the data related to the set-up in the second section is data that specifies a display pattern of the image data. Consequently, the display pattern of the image data sent from the transmitting apparatus can be readily judged at the receiver's end.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A method for isochronously transmitting data on a predetermined bus line which supports asynchronous transmission of control data between devices linked thereto, the data including audio channel data representing sounds reproducible on a plurality of audio channels, comprising:

arranging the audio channel data for each of the plurality of audio channels in a plurality of first data units, each first data unit having a predetermined data length;

setting up a second data unit having the predetermined data length, the second data unit including a label section, a data transmission section having a plurality of variable length data portions containing data relating to the positioning of speakers for respective ones of the plurality of audio channels, and a sub-label section representative of a quantity of the variable length data portions and of a length of the data contained in each of the variable length data portions; and transmitting the plurality of first data units and the second data unit between devices linked to the predetermined bus line.

2. The method as claimed in claim 1, wherein the plurality of first data units are assembled with the second data unit in a packet and the step of transmitting includes transmitting the packet between the devices linked to the predetermined bus line.

3. A data transmission apparatus, comprising:

means for arranging audio channel data for each of a plurality of audio channels in a plurality of first data units, each first data unit having a predetermined data length, and for setting up a second data unit having the predetermined data length, the second data unit including a label section, a data transmission section having a plurality of variable length data portions containing data relating to the positioning of speakers for respective ones of the plurality of audio channels, and a sub-label section representative of a quantity of the variable length data portions and of a length of the data contained in each of the variable length data portions; and means for isochronously transmitting the plurality of first data units and the second data unit on the predetermined bus line for reception by a data receiving apparatus linked to the predetermined bus line.

4. The data transmission apparatus as claimed in claim 3, wherein said isochronously transmitting includes assembling the plurality of first data units with the second data unit in a packet and transmitting the packet between the devices linked to the predetermined bus line.

* * * * *